US010803037B2

(12) United States Patent
Lipka et al.

(10) Patent No.: US 10,803,037 B2
(45) Date of Patent: Oct. 13, 2020

(54) ORGANIZING ELECTRONICALLY STORED FILES USING AN AUTOMATICALLY GENERATED STORAGE HIERARCHY

(71) Applicant: Adobe Inc., San Jose, CA (US)

(72) Inventors: Nedim Lipka, San Jose, CA (US); Tim Gollub, Weimar (DE); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 535 days.

(21) Appl. No.: 15/049,172

(22) Filed: Feb. 22, 2016

(65) Prior Publication Data

US 2017/0242906 A1 Aug. 24, 2017

(51) Int. Cl.
*G06F 16/22* (2019.01)
*G06F 16/13* (2019.01)
*G06F 16/23* (2019.01)

(52) U.S. Cl.
CPC .......... *G06F 16/2237* (2019.01); *G06F 16/13* (2019.01); *G06F 16/23* (2019.01)

(58) Field of Classification Search
None
See application file for complete search history.

(56) References Cited

U.S. PATENT DOCUMENTS

| | | | | |
|---|---|---|---|---|
| 8,473,532 B1 * | 6/2013 | Ben | ................... | G06F 17/30091 707/694 |
| 8,756,260 B2 * | 6/2014 | Sina | ................... | G06F 17/30268 707/783 |
| 9,805,042 B1 * | 10/2017 | Meyer | ................... | G06F 16/16 |
| 2003/0045953 A1 * | 3/2003 | Weare | ................... | G10H 1/0041 700/94 |
| 2011/0295773 A1 * | 12/2011 | Fisher | ................... | G06F 17/30994 706/11 |
| 2013/0212067 A1 * | 8/2013 | Piasecki | ................... | G06F 17/30176 707/620 |

OTHER PUBLICATIONS

Dell Latitude D600 2004, Dell Inc., https://www.dell.com/downloads/us/products/latit/d600_spec.pdf.*

(Continued)

*Primary Examiner* — Jason G Liao
(74) *Attorney, Agent, or Firm* — Finch & Maloney PLLC

(57) ABSTRACT

Methods and systems are described that automatically organize directory hierarchies and label individual directories systematically. Upon a number of files in a first directory exceeding a maximum number of files, a second directory is created. The files formerly disposed only in the first directory are organized into both of the first directory and the second directory so that the threshold number of files is not exceeded in either of the first or second directories. Organizing the files into the first and second directories uses vector representations of each of the files generated by the system so that, when organized, the first and second directories each include files with similar content. Labels are selected for each of the directories based on a comparison between a vector representation of the collective contents of each directory and vector representations of titles in a database.

20 Claims, 6 Drawing Sheets

(56) References Cited

OTHER PUBLICATIONS

Manning et al., Introduction to Information Retrieval 2008, Cambridge University Press, https://nlp.stanford.edu/IR-book/html/htmledition/irbook.html; https://nlp.stanford.edu/IR-book/html/htmledition/cluster-labeling-1.html.*

Manning, Introduction to Information Retrieval Apr. 7, 2009, Cambridge University Press, HTML Edition, https://nlp.stanford.edu/IR-book/html/htmledition/irbook.html, /hierarchical-clustering-1.html.*

Duda et al., Pattern Classification 01, Wiley & Sons, 2nd ed., pp. 537-542.*

Carmel, et al., "Enhancing Cluster Labeling Using Wikipedia", in Proceedings of the 32nd International ACM SIGIR Conference on Research and Development in Information Retrieval (SIGIR '09), pp. 139-146 (2009).

Gabrilovich, et al., "Computing Semantic Relatedness using Wikipedia-based Explicit Semantic Analysis", in Proceedings of the 20th International Joint Conference on Artifical Intelligence (IJCAI '07), pp. 1606-1611 (2007).

Silva, et al., "Data Stream Clustering: A Survey", ACM Computing Surveys, vol. 46, issue 1, article 13 (Oct. 2013).

"ClickStream—Getting Started—Explorations", available at <https://github.com/valgog/wmf/blob/master/clickstream/ipython/Wikipedia%20Clickstream%20-%20Getting%20Started-Extended.ipynb> (Jun. 25, 2015).

* cited by examiner

200

500

US 10,803,037 B2

ORGANIZING ELECTRONICALLY STORED FILES USING AN AUTOMATICALLY GENERATED STORAGE HIERARCHY

TECHNICAL FIELD

The present disclosure relates generally to storing and organizing electronic files within an electronic storage system. Specifically, the present disclosure is directed to organizing electronically stored files using an automatically generated storage hierarchy.

BACKGROUND

Electronically stored files are generally presented in a user interface as stored within a hierarchy of directories. The directories are often depicted in the user interface as folders, and the hierarchy is often depicted as a series of sub-folders "nested" within one or more other folders. Regardless of how depicted, directories can represent a collection of files or sub-folders comprising increasingly narrow fields of subject matter. For example, a "top level" or "parent" directory might relate to all departments within a corporate entity. The next level of sub-directories (i.e., "child" directories representing subject matter scope narrower in scope than the parent directory) within parent directory could include directories corresponding to each individual department within the corporate entity. Similarly, the next level of sub-directories within each department-specific sub-directory could include sub-directories for each individual employee in the corresponding department, within which are stored files relating to the corresponding employee. This hierarchy of nested directories, sub-directories, and files is an intuitive progression from broad subject matter to narrow subject matter that facilitates storing and locating files.

Figure 1:
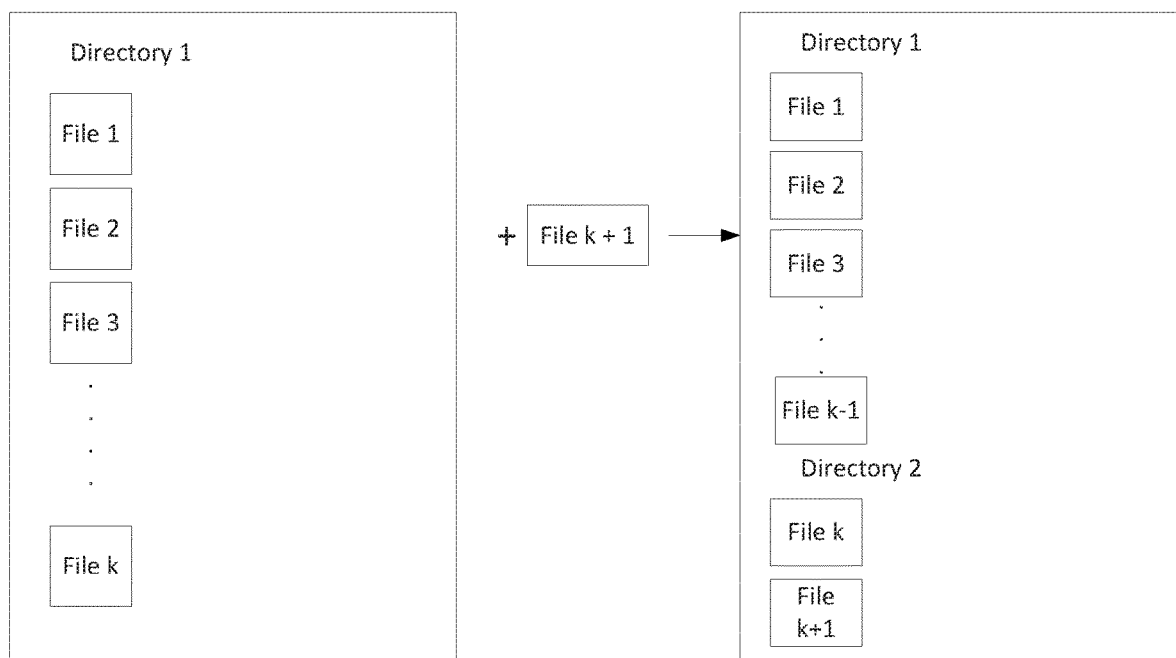
FIG. 1 schematically illustrates separating files in a first directory into both of the first directory and a newly created second directory so that the number of files in each directory is below a threshold, in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

Methods and systems are described that are used to organize directory hierarchies systematically upon addition of files to a file storage system based on the semantic content of the files and directories. Methods and systems are also described that label individual directories systematically based on the semantic content of the files stored in the individual directories.

Once a digital file is stored in a directory (or sub-directory) of a directory hierarchy in a digital storage system, users attempting to retrieve the stored file at a later time often have trouble locating the file. For example, a user attempting to retrieve the file may not know the name of the file or the directory (or sub-directory) in which the file was stored. This problem is compounded as the number of users of a storage system increases because naming conventions used by different users to name files and directories can vary widely from user to user. Also, the organization of a directory hierarchy (e.g., the creation of nested sub-directories and directories) created by a user within the system may vary widely from user to user. Furthermore, the decision of which location within the hierarchy at which to store a file may also vary widely between users. Because of these reasons, it can be difficult to find a file in a storage system with many users.

The challenges in finding a desired file also mount as the number of stored files, the number of directories, and the complexity of directory hierarchies increase. This is because there are more possible storage locations for every file. Distributed computing environments, such as "cloud" computing environments, add another challenge because the files can, in some cases, be distributed not only throughout directories and sub-directories of a hierarchy on a single storage system, but across different cloud computing systems, each with its own hierarchy.

While using a keyword search function can, in some cases, be helpful for finding a file, this method can also be inadequate. Whether or not a keyword search is effective at finding a file depends on the words used by the author of the file—that is, whether the searched keyword is present in the file. Files lacking the searched keyword (or keywords) will not be identified in the search. Equally problematic is the situation in which the searched keyword is commonly used by authors in different contexts. In this case, too many files will be found and the search will likely be ineffective as a result.

To address these challenges, some embodiments of the present disclosure include methods to organize directory hierarchies and to label individual directories systematically. For example, to organize a directory hierarchy upon addition of new files, a maximum number (referred to herein as a "threshold") of files permitted to be stored in a directory is set for directories in a storage system. Upon a first directory exceeding the threshold number of files, for example by an additional file being saved to the first directory, a second directory is created. The second directory can either be a sub-directory of the first directory or be a directory at a same organizational "level" within the hierarchy. The files formerly stored only in the first directory are organized into both of the first directory and the second directory so that the threshold number of files is not exceeded in either of the first or second directories.

The files are organized using vector representations of some or all of the files to group files with similar content into a same directory. To identify which files have similar content, vector representations of the individual files are generated. The vector representations are used to generate a similarity score quantifying a similarity between pairs of files to be organized. Generating the similarity score can include using a cosine similarity function, although other types of similarity functions may also be used. Using the similarity scores, files most similar in content to each other (relative to the other possible pairs of files) are identified. Files similar to one another are stored in one of the directories and the remainder are stored in the other directory so that the number of files in both the first directory and the second directory are below the threshold number of files.

For example, assume a first directory has a threshold of four files. The four files initially stored in the first directory include three files describing fishing techniques and a fourth file describing a restaurant serving fish. An additional file describing a restaurant quality review is sought to be stored in the first directory. However, storing the additional file in the first directory would cause the directory to exceed the threshold. Thus vector representations of files are used to compute a similarity score for possible pairs of files. Upon determining the similarity scores, the three files describing fishing techniques are identified as similar to one another and are stored in the first directory. The two restaurant-related files are identified as similar to one another and are stored in a newly generated second directory. The threshold of four files is thus not exceeded by either of the first directory or the second directory. Files can also be organized using embodiments of the present disclosure in a hierarchy of recently used files. Unlike existing operation systems that merely display recently used files in chronological order of use, some embodiments of the present disclosure can present recently used files as organized into one or more directories of related files, as described herein.

To provide consistent directory labels that reflect the content of files stored within each directory, directory labels are generated by first generating a vector representation of some or all of the files within a directory, collectively. The analysis of the content of files can be referred to in terms of the "semantics," or meaning, of the files as determined by analysis of the vector representations of the files. The directory vector representation is then compared to vector representations of article titles of a database (such as Wikipedia, in one example) to find a semantically similar article title (using, for example cosine similarity). Once a semantically similar article title is identified in the database, this title is used to label the directory. This process can be recursively repeated as the files within the directories themselves change and/or the contents of the individual files change. Thus, the label of the directory accurately reflects the collective content of the directory even as that content changes.

Furthermore, some embodiments of the present disclosure include a semantic search function. The semantic search function identifies directories and/or files that are semantically similar to directories and/or files that have been selected by the user as the "search terms." Upon selection of one or more files/and or directories, a vector representation of the selected files and/or directories is generated. The vector representation of the selection is then used as a "search term" for other folders and/or directories having similar vector representations as indicated through a similarity score (determined using, for example, cosine similarity). This method thus enables efficient searching based on the content of the files and/or directories, rather than merely based on keywords.

Benefits of some embodiments of the present disclose include a storage system in which files are automatically organized based on (1) a maximum number of files in the directory and (2) the similarity of content between the files in the directory. This improves consistency of the content within directories of a hierarchy and reduces the inconvenience of manually organizing files. Another benefit of some embodiments is a more consistent and logical organization of directories and files within a hierarchy, thus improving the ability of users to find files and related files. Specifically, the ability of a user to manually explore files stored in the hierarchy is improved using directories organized and labeled according to some of the embodiments described herein. Another benefit of some embodiments of the present disclosure includes automatic labeling of directories within the hierarchy that reflects the contents of the directory, rather than a label arbitrarily selected by a user. Another benefit of some embodiments of the present disclosure is the ability to use the semantic search function to search for semantically similar files and to view the search results organized into directories. Having files organized into directories can provide a user with a higher level perspective of the semantic subjects described in the files. Yet another benefit of embodiments of the present disclosure is a search function based on the content of one or more selected files and/or directories so that files having a similar semantic meaning to the collective selected files and/or directories are identified.

As used herein, a storage system includes any digital storage system or combination of digital storage systems used to store digital files. Examples of storage systems include distributed computing environments (e.g., the "cloud," explained below in more detail in the context of FIG. 6A), shared and/or proprietary storage area networks, local non-transitory storage media (e.g., a computer hard drive, removable flash memory), and combinations thereof.

As indicated above, a directory is a file system structure that contains files (or more specifically references to files) that have been identified as related to one another. Directories may include sub-directories that represent a collection of files related to one another and that are a subset of the files within the directory as a whole.

A hierarchy, as used herein, refers to an organization of directories and sub-directories within a storage system. For example, a "top-level" of directories, representing the broadest level of organization within a storage system, may each include a series of sub-directories at a "second level" of organization representing a narrower level of organization within a storage system. Each of these sub-directories may also include more levels of sub-directories, each of which represents a level of organization that contains files that are more closely related to one another or are related to a narrower range of subject matter.

A file is any digitally stored data that, when rendered, displays text or images, or when executed, performs one or more functions on a computing device. Examples of files include text files, image files, and executable files, among others. A storage location of a file in a hierarchy can be represented as a "file path," which is a listing of each directory label from broadest to narrowest.

A vector representation (alternatively known as a "feature vector") of a file is a numerical representation of the contents of the file. In some examples herein, the feature vector of a text file can be a frequency of various words or combinations of words determined using a "bag of words" model (i.e., a model that disregards grammar and syntax).

A similarity score is an output of a similarity function that operates on vector representations files being compared. For example, cosine similarity is a measurement of similarity between two vectors based on a cosine of an angle between the two vector representations, as is commonly known.

Organizing Files in a Directory Hierarchy

FIG. 1 is a schematic illustration of a first directory that is organized into a first directory and a second directory upon receiving an additional file in the first directory so that the number of files in the first directory exceeds a threshold, in accordance with an embodiment of the present disclosure. As shown in an initial state, "Directory 1" includes a number of files from "File 1" to "File k", where k is threshold that indicates a maximum number of files to be stored in the directory. The threshold k can be any number selected by an administrator of the system, but in some embodiments can be from 5 to 20 files or from 10 to 15 files. Regardless of the number selected, for illustration purposes Directory 1 is shown as having stored the maximum number of files k permitted in a single directory.

An additional file, identified as "File k+1" is sought to be stored in Directory 1. However, as indicated above, the maximum number of files k is already stored in Directory 1. Because the threshold of Directory 1 is thus exceeded by the addition of File k+1, some embodiments of the present disclosure are applied to organize the files numbered from File 1 to File k+1 into more than one directory, each of which will have fewer files than the threshold number of k files.

As is shown, upon the attempted addition of File k+1 to Directory 1, an additional directory, Directory 2, is generated. File k and File k+1 are stored in Directory 2, while the remaining files (File 1 to File k−1) remain in Directory 1. The selection of File k and File k+1 for storage in Directory 2 is based upon a similarity score determined for some or all of the possible combinations of two files from the group of File 1 to File k+1, as will be described below in more detail. That is, the selection of files to be stored in Directory 1 versus the selection of files to be stored in Directory 2 is based upon a similarity in content between the various files, as determined using vector representations of the files.

As will be apparent from other embodiments disclosed herein, the scenario depicted in FIG. 1 is not limiting of the types of hierarchies to which embodiments of the present disclosure can be applied. For example, while Directory 2 is shown as independent from Directory 1 (i.e., they are at a same "level" within a storage system hierarchy), other scenarios can include generating a sub-directory within a higher level directory.

Figure 2:
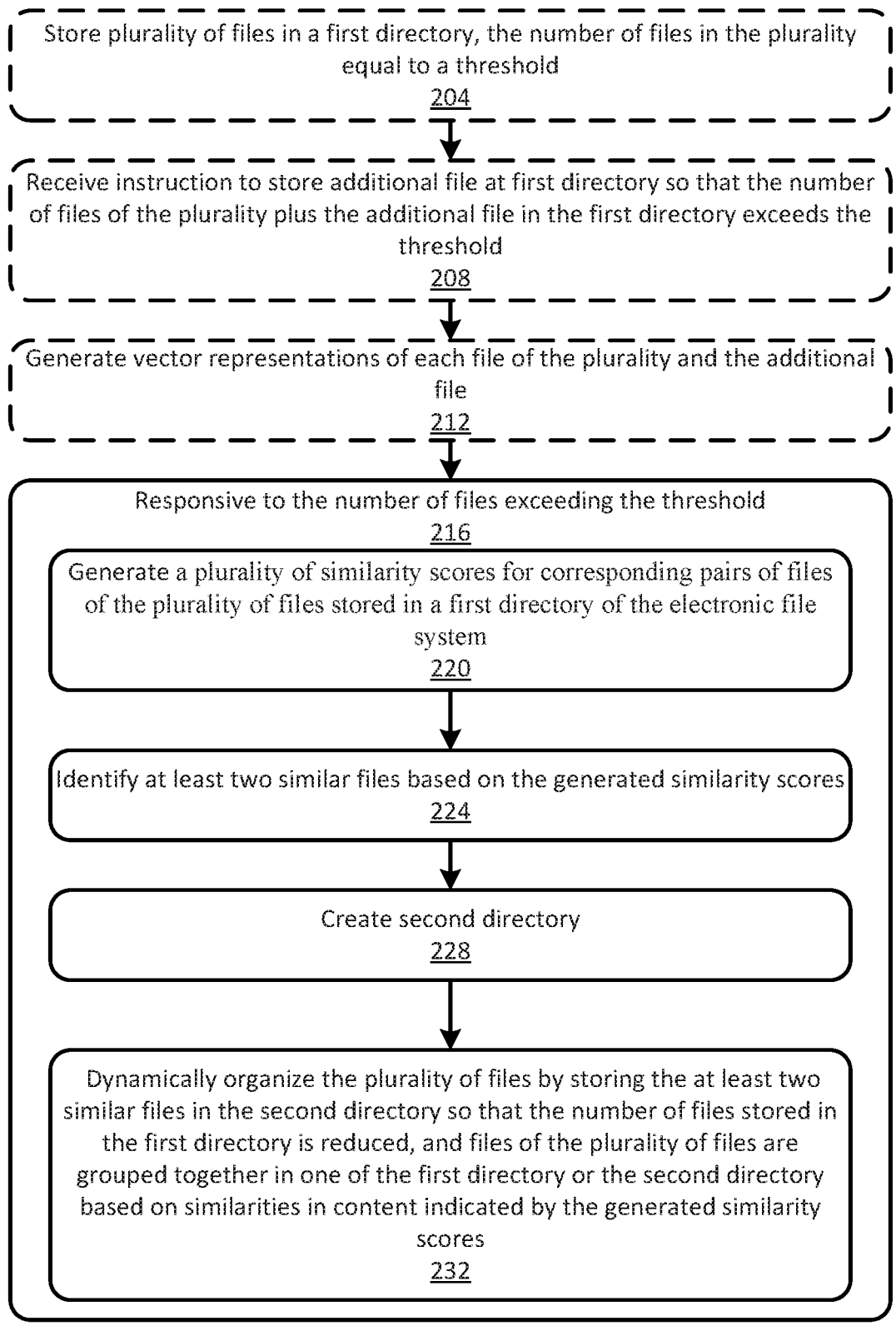
FIG. 2 is a flow diagram illustrating a method for organizing files using a vector representation of the files, in accordance with an embodiment of the present disclosure.

FIG. 2 is a flow diagram illustrating a method 200 for organizing files using a vector representation of the files, in accordance with an embodiment of the present disclosure. As with the scenario depicted in FIG. 1, the method 200 begins, optionally, with storing 204 a plurality of files at an electronic storage system (e.g., a cloud storage system, or a storage area network) in a first directory. As indicated above, a directory is a file system structure that contains files (or more specifically references to files) that have been identified as related to one another. Directories may also contain one or more sub-directories and the embodiments herein may be applied to generate sub-directories within a directory as well as create directories at a same level. For convenience of explanation, the embodiment described below describes a scenario in which the number of files stored in the first directory is equal to a threshold maximum number of files permitted to be stored within the first directory.

In this example, presented for clarity of explanation, an instruction is optionally received 208 to store an additional file at the first directory at the first directory so that the total number of files in the first directory (i.e., the number of files in the plurality of files plus the additional file) exceeds the threshold number of files. In some embodiments, another indication of exceeding a maximum number of files permitted to be stored in the directory is activated. Regardless, because the maximum number of files (set as a threshold) is exceeded, the files in the first directory and the additional file that was sought to be stored in the first directory will be organized so (1) the number of files in the first directory is reduced to below the threshold and (2) the most similar files are grouped together within a directory. Also, (3) a second directory will be generated to store files not stored in the first directory, as described in more detail below.

A vector representation of some or all of the files of the plurality of files in the first directory and the additional file are generated 212. Vector representations (also known as feature vectors) are numerical representations of files and are commonly used in various aspects of computational linguistics. Vector representations of files can be generated 212 according to any of a variety of existing or subsequently developed methods. For example, an n-dimensional vector representation of a text file can be generated using a "bag of words" model that disregards syntax and grammar. As indicated above, a vector representation of text file analyzed using the bag of words model is a frequency count of words occurring in a file. Various other types of feature extraction algorithms may also be applied to generate 212 vector representations of the various files.

Responsive to determining 216 that the number of files permitted to be stored in the first directory exceeds the threshold, files in the first directory that have similar content are identified and organized into the existing first directory. Other files identified as similar are stored in a new second directory so that the number of files in each of the first directory and the second directory are below the threshold. In alternative embodiments, the files can be organized into any combination of directories and/or sub-directories for storing a number of files that do not exceed the threshold. Using the vector representations of some or all of the files of the plurality of files and the additional file, a plurality of similarity scores for corresponding pairs of files of the plurality of files stored in a first directory of the electronic file system are generated 220. The use of a similarity score for pairs of files quantitatively identifies which of the files are most similar to one another. As mentioned above, one similarity score that can be used is the cosine similarity in which the "angle" between the vector representations of the files is quantified. In this methodology, the smaller the "angle," the more similar the files. Using the similarity scores, regardless of the computational method used to generate them, at least two files are identified 224 as similar among all of the pairs of files. Continuing with the cosine similarity example, the "most similar" pair of files will be those two files that have a similarity score that is closest to an "angle" of zero. Other similarity score methods or file clustering algorithms (e.g., k-mean or hierarchic agglomerative clustering) will produce different types of outputs but the effect of identifying 224 at least two files that are the most similar will be the same.

A second directory is created 228 in which the identified 224 two similar files are stored and thus dynamically organized 232 by storing the at least two similar files in the second directory so that the number of files stored in the first directory is reduced, and files of the plurality of files are grouped together in one of the first directory or the second directory based on similarities in content indicated by the generated similarity scores. That is, the dynamic organization 232 reduces the number of files in the first directory to below the threshold number of files. Furthermore, the second directory is used to store subsequent additional files that are similar to those already stored in the second directory and that are sought to be stored.

Some or all of the above elements of the method 200 can be recursively performed on the contents of the directories as new files are sought to be stored. Performing the method 200 as existing files are edited and new files are added maintains the contents of each directory to those files similar to one another (as indicated by similarity scores). In this way, each directory stores a "class" or "cluster" of files that are similar.

An algorithmic expression describing some embodiments of elements 216-232 of the method 200 is shown below as Algorithm 1.

---
Algorithm 1
---

Input: parent cluster C, vector representations V.
Parameter: fan-out k.
1: while |C| > k do
2:     $(C_i, C_j)$ = findMostSimilarChildren(C);
3:     $C_n = \{C_i, C_j\}$;   $C \leftarrow C \setminus \{C_i, C_j\} \cup C_n$;
4:     $v_n = v_i + v_j$;   $V \leftarrow V \setminus \{v_i, v_j\} \cup v_n$;
5:     cluster($C_n$, V);

---

In Algorithm 1, "C" (a "cluster" or alternatively a "class") refers to a plurality of semantically similar files that are stored within a directory, where subscripts denote "child" directories that are within a "parent" directory (denoted without a subscript). A capital letter "V" indicates a vector representation of the contents of a directory as a whole where a lower case "v" indicates a vector representation of an individual file. "Fan-out k" refers to the maximum number of files within a directory, otherwise identified herein as the threshold.

Upon receipt of the additional file that causes the plurality of files C to exceed 216 the threshold k, the condition of step 1 of the Algorithm 1 is met. Then, as described above, step 2 of Algorithm 1 generates 220 a similarity score for pairs of files in the group of files that includes the additional file and the plurality of files, as described above. Step 3 of Algorithm 1 describes identifying 224 at least two similar files based on the generated similarity score, creating 228 a second (or additional when other directories are already present) directory ($C_n$), and storing 232 the at least two similar files in the second directory so that the number of files in the first directory and a number of files in the second directory are each below the threshold. Step 4 generates a vector representation $v_n$ for the second directory ($C_e$) that, in one embodiment, is a sum of the two file vectors $v_i + v_j$. Step 5 indicates that the method 200 (and the Algorithm 1) are applied recursively to each directory upon exceeding the threshold, ultimately leading, in some examples, to complex nested hierarchies of directories.

Labeling Directories in a Directory Hierarchy

Figure 3:
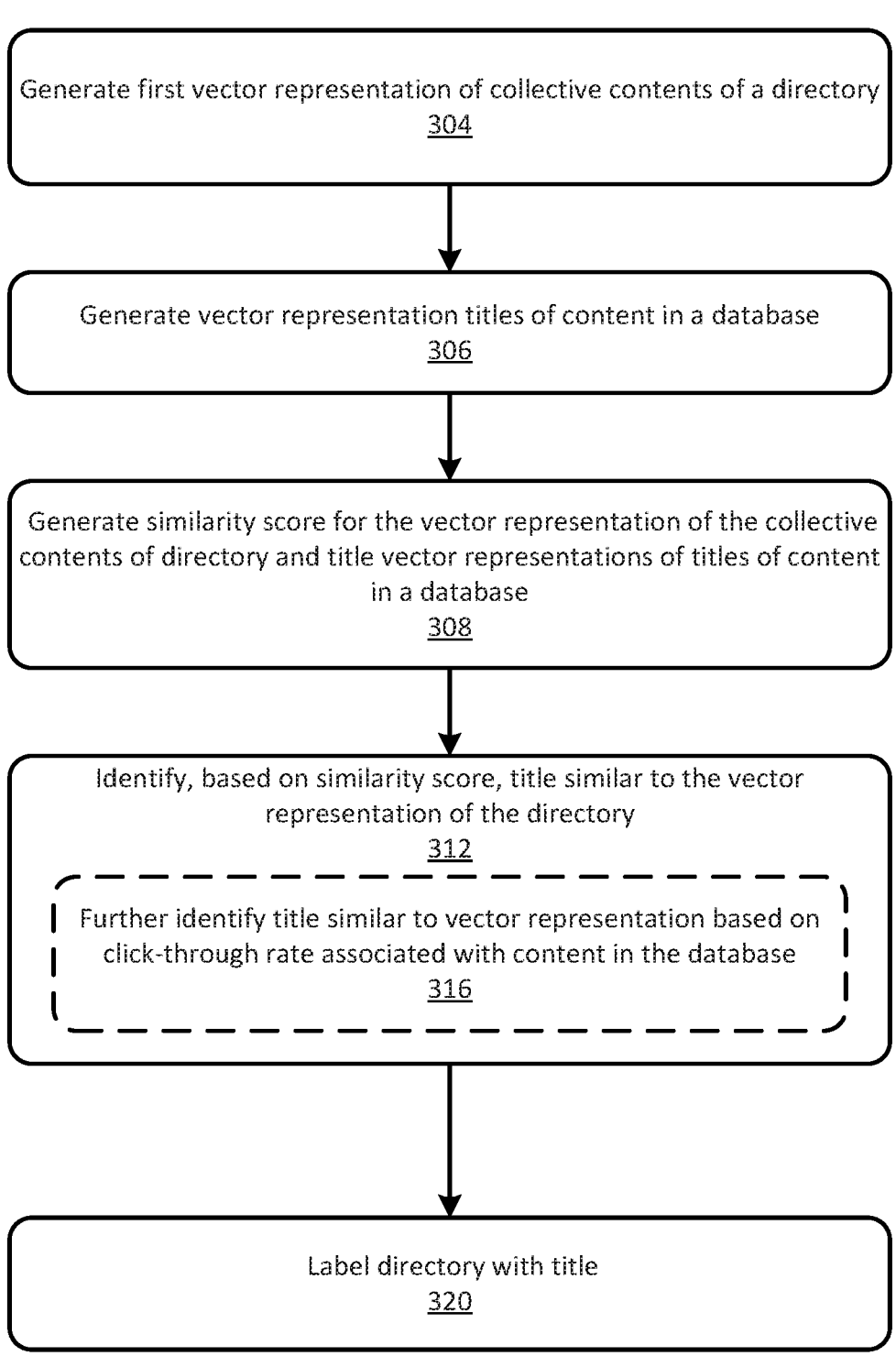
FIG. 3 is a flow diagram illustrating a method for naming directories based on a similarity between a vector representation of content in the directory and a vector representation of article titles in a database, in an embodiment of the present disclosure.

Because the method 200 generates directories for storing semantically similar files and maintains semantic similarities within directories even as new files are stored within the directory hierarchy or the contents of existing files in the hierarchy are edited, labels of each of the directories can be selected in a way that accurately represents the contents of a directory as a whole. An example method 300, as depicted in FIG. 3, illustrates a method for selecting labels for the directories of the directory hierarchy.

The method 300 begins by generating 304 vector representations of the contents of all of the files in the directory. That is, rather than generating a vector representation for individual files in a directory, a single vector representation of all of the files collectively is generated. Continuing with the example presented above in the context of FIG. 2, the contents of all of the files can be combined, and an n-dimensional feature vector is generated based on "bag of words" word frequencies.

Vector representations of titles of content items in a database are generated 306. Examples of titles and databases that can be used in various embodiments include titles of items in the Library of Congress (and that are listed in a digitally accessible catalog), titles of articles in Wikipedia, titles of articles in a digitally accessible encyclopedia, a library of titled content items in a proprietary database (such as a confidential and proprietary knowledge base used in a research institution) and others. Regardless of the database actually used, preferably the database will have a number of titles of content items semantically similar or semantically related to files stored in the data storage system. In some examples, for storage systems in which files stored may cover any of a wide range of topics, a database such as WIKIPEDIA® may be preferable because of the wide range of topics described therein. For storage systems that are more likely to be focused in a narrower range of subject matter, a correspondingly focused database may be sufficient. For example, a dedicated storage system for an academic biochemistry department may choose to select its titles based on a database of peer-reviewed publications maintained by a government agency (e.g., Centers for Disease Control) or a scientific journal (e.g., ELSEVIER®). Vector representations of titles of content items in a database are generated 306. Examples of titles and databases that can be used in various embodiments include titles of items in the Library of Congress (and that are listed in a digitally accessible catalog), titles of articles in Wikipedia, titles of articles in a digitally accessible encyclopedia, a library of titled content items in a proprietary database (such as a confidential confidentially and proprietary knowledge base used in a research institution) and others. Regardless of the database actually used, preferably the database will have a number of titles of content items semantically similar or semantically related to files stored in the data storage system. In some examples, for storage systems in which files stored may cover any of a wide range of topics, a database such as WIKIPEDIA® may be preferable because of the wide range of topics described therein. For storage systems that are more likely to be focused in a narrower range of subject matter, a correspondingly focused database may be sufficient. For example, a dedicated storage system for an academic biochemistry department may choose to select its titles based on a database of peer-reviewed publications maintained by a government agency (e.g., Centers for Disease Control) or a scientific journal (e.g., ELSEVIER®).

Regardless of the database selected to provide directory labels in the storage system, a similarity score 308 is generated to quantify a similarity between the vector representation of the collective contents of a directory and vector representations of the content titles in the database. As explained above, cosine similarity is a convenient method by which to determine the similarity score but other similarity functions may be used to determine the degree of similarity between the collective content of the directory and the various titles, such as by using cosine similarity.

A content title in the database that is similar to the collective contents of the directory is identified 312 based on the similarity score generated 308. Titles may optionally be further identified 316 based a "click-through" rate associated with the content corresponding to the title. That is, those content items frequently accessed by users (either as a function of time or in absolute number) are presumed to be the most relevant. Thus, from a subset of multiple titles having approximately a same similarity score compared to the collective contents of a directory, a single title can be selected by identifying which title of the subset is associated with the most frequently accessed content item.

Once the title has been identified 312 (and optionally 316), the directory is labeled with the identified content title 320. This process is, in some examples, recursive so that as the content of a directory changes (either through a change in the files stored therein or a change in the content of the files), the label for the directory can be updated by performing the method 300 any number of times.

In one embodiment of the method 300, Algorithm 2 shows a computationally efficient method of further identifying 316 content titles based on click-through rate that can be used as directory labels. In this embodiment, Algorithm 2 analyzes content items linked (e.g., via a user resource link) to those content items associated with titles identified 312 by the method 300.

---
Algorithm 2
---

Input:      seed article set $L_0$.
Parameter:  breadth b, depth d.
1:  $L \leftarrow \{ \}$;
2:  for i=0; i<d; ++i do
3:      for l in $L_i$ do L' = exploreTopLinks(l,b);
4:          for l' in L' do
5:              If l' in L then countUp(l');
6:              else $L_{i+1} \leftarrow L_{i+1} \cup l'$;
7:          $L \leftarrow L \cup l$;

---

In Algorithm 2, $L_0$ is a set of content titles that can be either intentionally selected (such as those titles identified 312 by execution of the method 300) or, in some embodiments, randomly selected from a database. Ultimately, the set L contains an expanded selection of content titles beyond those already identified 312 and that can be optionally used to label 320 a directory. However, in the example shown of Algorithm 2, the set L starts as an empty set having no content titles. In each of d iterations of Algorithm 2, as shown in step 3 and step 4 of Algorithm 2, content titles are identified and added to the set L based on those content items b that are most frequently accessed (i.e., with the highest click-through rate) and that are also linked within the content items added in the last iteration (i.e., already selected as part of L). As indicated in steps 5, 6, and 7 of Algorithm 2, if a new content item is identified, it is added to the set L. If a content item identified is already in the set L, a count associated with the content item is increased by one. The counts can be used to rank the most visited content items, with the highest ranking content items being preferentially used to label 320 directories.

Searching by Selected Files and/or Directories

As described above, searching for a file based on keyword selection can produce results that return too many search results, too few search results), or identify files that use the search term but are not relevant. To address this problem, some embodiments of the present disclosure include a search function that is based on a selection of one or more files and/or directories. The selected files and/or directories are used to generate a vector representation of the selection. The vector representation of the selection is then used as a search term to identify semantically similar directories and/or files having similar (as indicated by a similarity score) vector representations.

Figure 4:
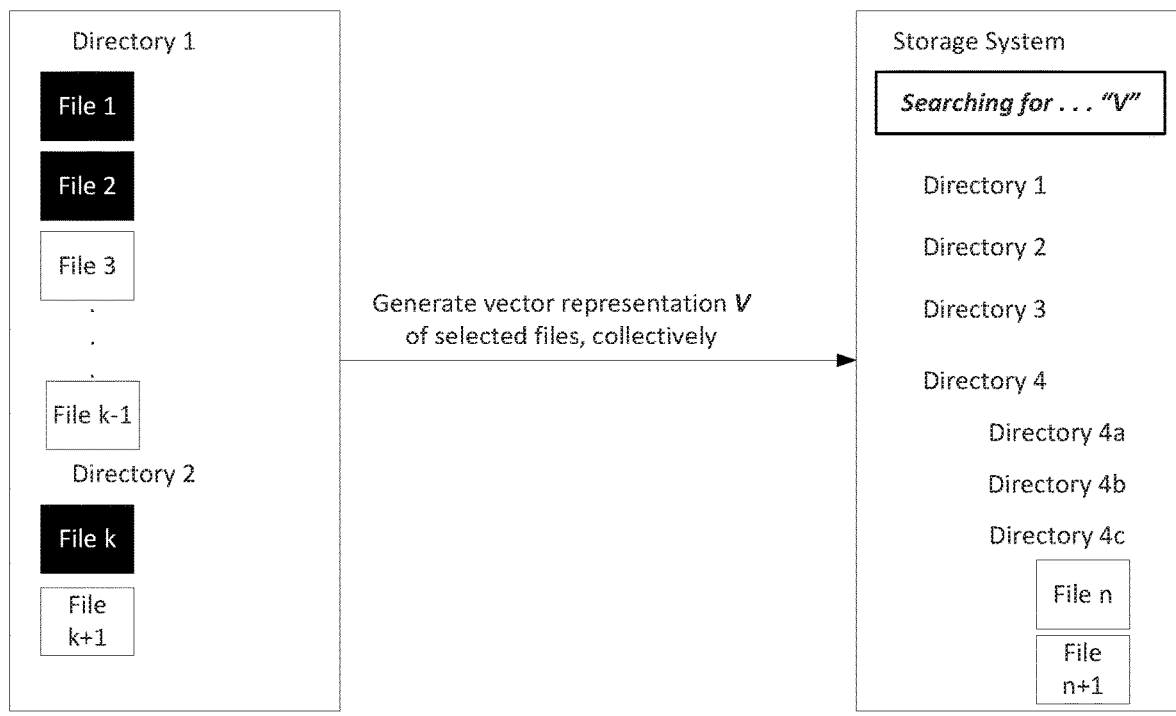
FIG. 4 schematically illustrates a search method in which one or more files is selected and a vector representation of the selected one or more files is used as search criteria for semantically similar content, in an embodiment of the present disclosure.

A schematic illustration of this search function is shown in FIG. 4. As shown by highlighting, "File 1" and "File 2" in "Directory 1" and "File k" in "Directory 2" have been selected. In other embodiments, it will be understood that additional, fewer, or different files, as well as entire directories can be selected without departing from the scope of the present disclosure. In the embodiment illustrated, these three selected files are then used to generate a vector representation "V" of the collective contents of the three files. As discussed above, one method of generating a vector representation includes using a bag of words model to generate an n-dimensional vector describing word frequency throughout the selected files, collectively. Once generated, the system searches the contents of the database for files and/or directories having a similar vector representation. As also described above, identifying a file and/or directory can be accomplished by generating a similarity score, using, in one example, a cosine similarity function. Because, in some embodiments, the system maintains vector representations for stored directories and files, this searching method is computationally efficient.

Figure 5:
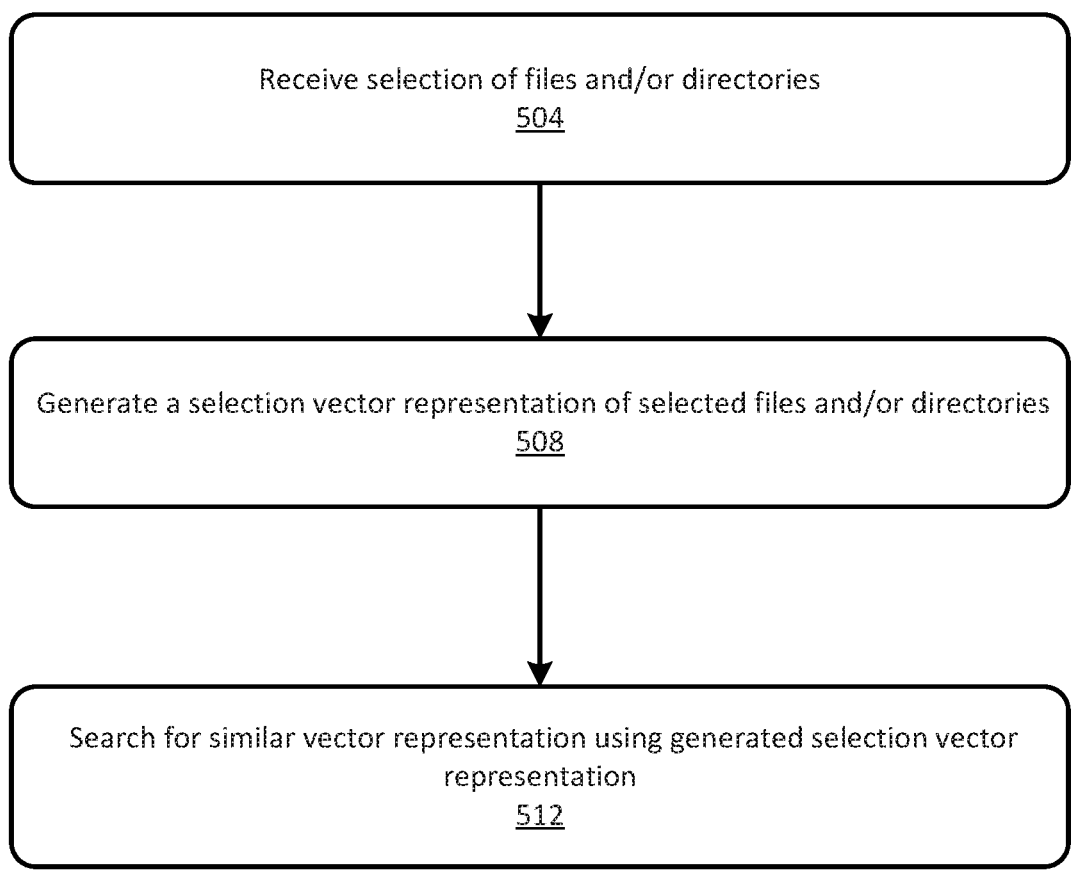
FIG. 5 is a flow diagram illustrating a method for searching for content of a storage system by selecting one or more files and/or directories and generating a vector representation of the selected files and/or directories to use as a search term, in accordance with an embodiment of the present disclosure.

FIG. 5 is a flow diagram illustrating a method for searching for semantic content of a storage system by selecting one or more files and/or directories and generating a vector representation of the selected files and/or directories to use as a search term, in accordance with an embodiment of the present disclosure and as schematically depicted in FIG. 4. As shown in FIG. 4 and described above, a selection of one or more files and/or one or more directories is received 504. A vector representation is generated 508 of the selection, which is then used as the "search term" for semantically similar files. In some examples, such as those in which a single file or a single directory are selected, a pre-existing vector representation maintained by the system can be used. In other examples, such as a selection of multiple files, multiple directories, and a mix of files and directories, a vector representation will be generated. Once a vector representation of the selection is generated 508, the vector representation is used as a "search term." A similar vector representation is searched for by comparing the vector representation of the selection to vector representations of files and/or directories in the system. Similarity is indicated by generating a similarity score, such as cosine similarity.

In some embodiments, the system maintains vector representations of each directory. In these embodiments, because the directories to be searched have a maintained, pre-existing vector representation, the search is computationally efficient because the generated 508 vector representation of the selected files and/or directories need only be compared to the pre-existing directory vector representations via cosine similarity.

Example Environment and System

Figure 6A:
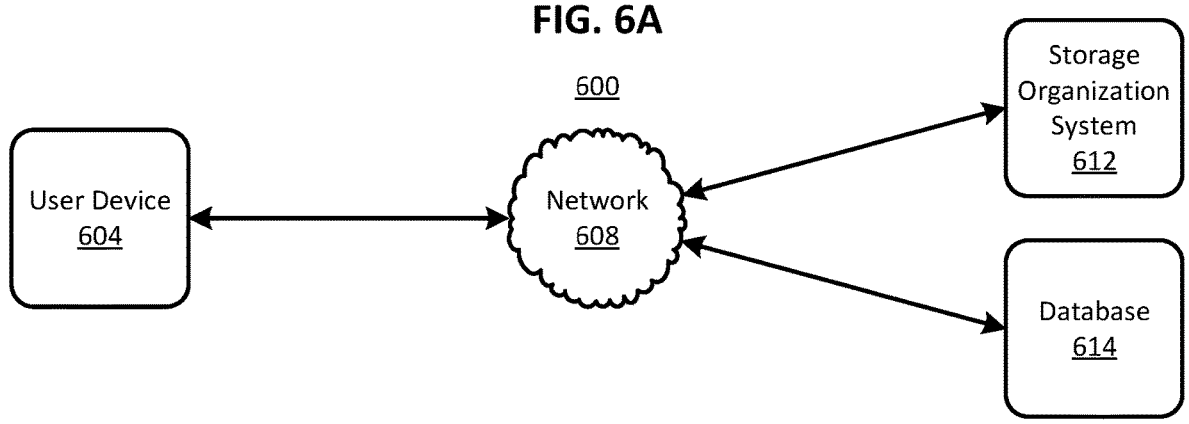
FIG. 6A is a block diagram of a distributed processing environment that includes a file organization system, in accordance with an embodiment of the present disclosure.

FIG. 6A is block diagram of a distributed processing environment 600 that includes a system for maintaining an organization of a storage system for digital files, generating labels of directories within the storage system, and searching for semantically similar content to generated vector representations of one or more selected directories and/or files, in an embodiment of the present disclosure. The system environment 600 shown in FIG. 6A includes a user device 604, a network 608, a storage organization system 612, and a database 614 including a plurality of content items. In other embodiments, the system environment 600 includes different and/or additional components than those shown in FIG. 6A.

The user device 604 is a computing device capable of receiving user input as well as transmitting and/or receiving data via the network 608. In one embodiment, the user device 604 is a computer system, such as a desktop or laptop computer. In another embodiment, the user device 604 may be a device having computer functionality, such as a personal digital assistant (PDA), mobile telephone, tablet computer, smartphone or similar device. In some embodiments, the user device 604 is a mobile computing device used storing digital files in a storage system, conducting searches using the storage organization system, and/or viewing or accessing files through the storage organization system. In one embodiment, the user device 604 executes an application allowing a user of the user device 604 to interact with the storage organization system 612, thus becoming a specialized computing machine. For example, the user device 604 executes a browser application to enable interaction between the user device 604 and the storage organization system 612 via the network 608. In another embodiment, a user device 604 interacts with the storage organization system 612 through an application programming interface (API) that runs on the native operating system of the user device 604, such as IOS® or ANDROID™.

The user device 604 is configured to communicate via the network 608, which may comprise any combination of local area and/or wide area networks, using both wired and wireless communication systems. In one embodiment, the network 608 uses standard communications technologies and/or protocols. Thus, the network 608 may include links using technologies such as Ethernet, 802.11, worldwide interoperability for microwave access (WiMAX), 3G, 4G, CDMA, digital subscriber line (DSL), etc. Similarly, the networking protocols used on the network 608 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 608 may be represented using technologies and/or formats including hypertext markup language (HTML) or extensible markup language (XML). In addition, all or some of links can be encrypted using encryption technologies such as secure sockets layer (SSL), transport layer security (TLS), and Internet Protocol security (IPsec).

In some embodiments, the network 608 includes one or more storage area networks, such as those used for "cloud" computing systems. In these embodiments, the storage organization system 612 can operation on the multiple cloud computing systems so that a consistent hierarchy, labeling, and searching system operates uniformly across the different cloud computing systems.

The storage organization system 612, described below in the context of FIG. 6B in more detail, comprises one or more computing devices for storing files, organizing files and directories, maintaining the organization files and directories as new files are stored in the system and existing files are edited, and providing a search function based on the content of selected files and/or directories. The storage organization system 612 is configured, upon receipt of a file or an edit to a file, to perform the some or all of the embodiments described above to maintain organization of a directory hierarchy, label directories in the hierarchy, and provide search functionality.

Figure 6B:
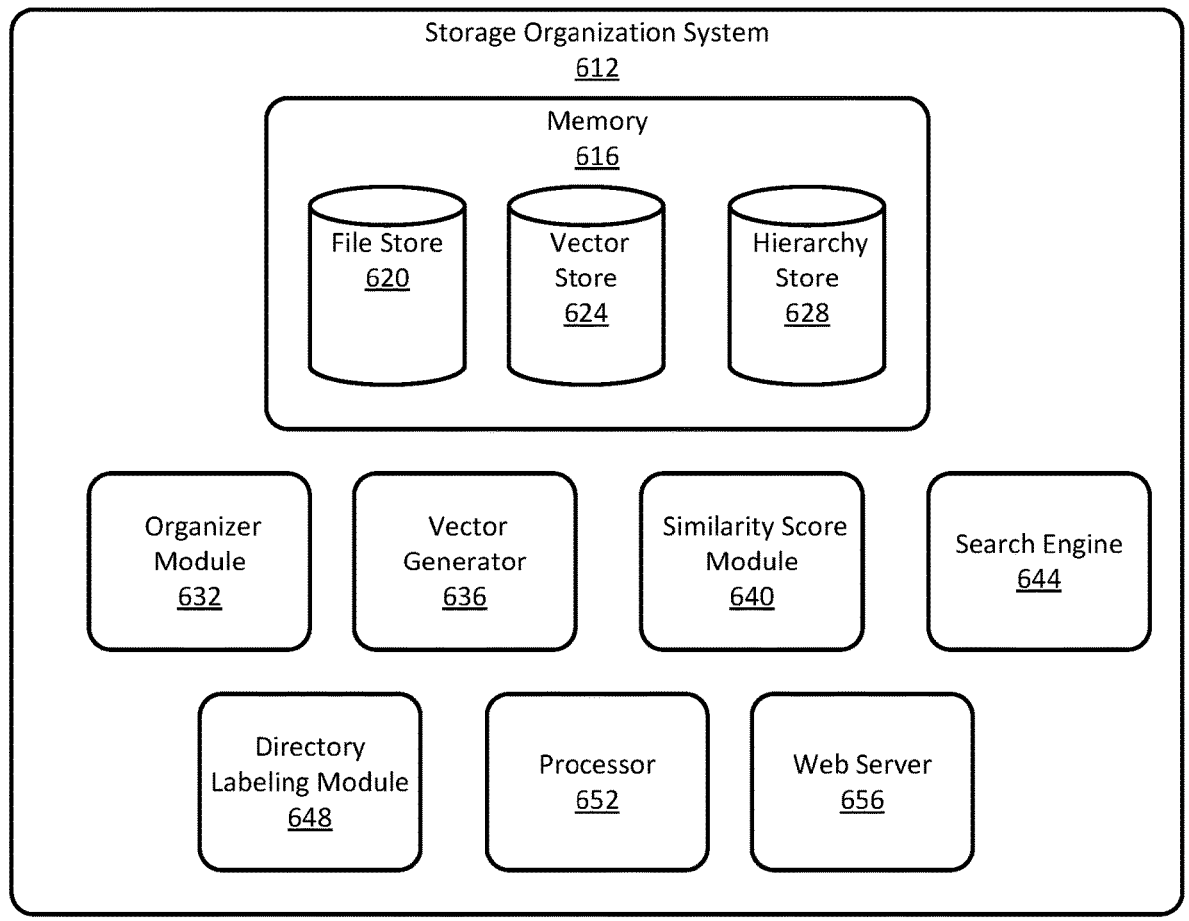
FIG. 6B is a block diagram of a file organization system configured to organize a directory hierarchy and files within the directory hierarchy, in accordance with an embodiment of the present disclosure.

FIG. 6B is a block diagram of a system architecture of storage organization system 612 as shown in FIG. 6A. The storage organization system 612 includes a memory 616, an organizer module 632, a vector generator 636, a similarity score module 640, a search engine 644, a directory labeling module 648, a processor 652 and a web server 656. It will be understood that some or all of the elements shown can alternatively be disposed within a storage system itself, and that the embodiment depicted of the storage organization system 612 is for convenience of explanation only.

The memory 616 is depicted as including three distinct elements: a file store 620, a vector store 624, and a hierarchy store 628. Each of these elements of the memory 616 stores instructions and data in a non-transitory computer readable medium (which may include any suitable optical or magnetic durable storage device, e.g., RAM, ROM, Flash, USB drive, or other semiconductor-based storage medium, a hard-drive, CD-ROM) that, when executed by one or more processors (e.g., processor 652), performs methods described above.

The file store 620 stores digitally encoded files for later access by users. Examples of the file store 620 include any combination of the non-transitory computer readable storage media indicated above that are configured for storing files of any type (e.g., text, image). Similarly, the vector store 624 includes any combination of the non-transitory computer readable storage media, but rather than storing files, the vector store 624 is configured for storing some or all of the vector representations that are used for some or all of the methods described above. For example, in some embodiments the vector store 624 stores vector representations of directories (or rather, the vector representations of the collective contents of directories). These can then be used in the execution of the method 500 as described above to improve the efficiency of embodiments of the search function described above. Similarly, the hierarchy store 628 stores instructions in non-transitory computer readable media that are used to maintain an organizational relationship between directories, sub-directories, and files and that, when rendered in a graphic user interface, can be depicted as icons of folders, sub-folders, files, and corresponding file paths.

The organizer module 632 monitors a number of files stored within each directory. The organizer module 632 also determines whether the number of files to be stored in a directory (such as the plurality of files and the additional file mentioned above in the context of FIG. 2) exceeds a threshold or is otherwise beyond a maximum number of files permitted to be stored in the directory. Upon determining that the threshold has been exceeded, the organizer module 632 initiates a dynamic reorganization of the files, as described above. Ultimately, the organizer module 632 organizes the various files in directories based on similarity scores, as described herein.

Upon the organizer module 632 identifying that the threshold number of files of a directory has been exceeded, the organizer module creates a second directory and instructs the vector generator 636 to generate vector representations of the various files associated with the directory that exceeds the threshold. As described above, any number of vector generation and feature vector extraction methods may be used. The example described above includes applying the bag of words model to text files and generating an n-dimensional vector quantifying word count frequencies for some or all of the files. Other types of vector generation methods may also be used. The vector generator 636 may also generate vector representations of the contents of directories collectively for various features, such as searching according to the embodiments described above.

Using the vector representations generated by the vector generator 636 the similarity score module 640 determines similarity scores between pairs of files of the directory exceeding the threshold number of files. As mentioned above, the similarity score used in some embodiments is cosine similarity, but other methods of computing similarity can equivalently be used.

The similarity score module 640 also determines similarity scores for other applications described above. For example, the similarity score module may determine a similarity score between the collective contents of a directory and titles in a database in order to select a label for the directory, as described in the context of FIG. 3. In another example, the similarity score module 640 may determine similarity scores between a vector representation of a selection of files and/or directories selected as a search term and vector representations of files and/or directories searched, as described above in the context of FIGS. 4 and 5.

The search engine 644 is generally applied for the search function described above in the context of FIGS. 4 and 5. The search engine 644 receives a search vector from the vector generator 636 that is a selection of one or more files and/or directories. Then, the search engine retrieves a vector of a stored file and/or directory from the vector store 624. The search vector and the vector of the stored file and/or directory to be searched are then passed to the similarity score module 640 for the generation of a similarity score. This process is repeated until the search results are presented to the user (through, for example, an instruction to the web server 656 to render the search results on the user device 604).

The directory labeling module 648, in cooperation with the vector generator 636 and the similarity score module 640, is used to identify and label directories based on a similarity score with titles of content within a database, as described above in the context of FIG. 3. One example of such a database is database 614 illustrated in FIG. 6A. For example, upon generation of a new directory or upon changes to the content of an existing directory, the directory labeling module 648 accesses a database and passes titles of content items in the database to the vector generator 636 to generate vector representations of the titles. These vector representations are then passed to the similarity score module 640 along with the vector representation of the directory to be labeled. This process is repeated for a number of titles from the database until a similar title (as quantified by a title having, for example, a cosine similarity "angle" with respect to the directory that is closest to zero) is identified. Based on the similarity score results, the directory labeling module 648 communicates to the hierarchy store 628 to change the label of the directory.

The storage organization system 612 also includes at least one processor 652 for executing computer-readable and computer-executable instructions or software stored in the memory 616 or any of the modules of the storage organization system 612. Virtualization may be employed so that infrastructure and resources in the storage organization system 612 may be shared dynamically. For example, a virtual machine may be provided to handle a process running on multiple processors so that the process appears to be using only one computing resource rather than multiple computing resources. Multiple virtual machines may also be used with the processor 652.

The web server 656 links the storage organization system 612 to the user device 604 via the network 608. The web server 656 serves web pages, as well as other web-related content, such as JAVA®, FLASH®, XML and so forth. The web server 656 may provide the functionality of receiving files from from the user device 604 for storage in a storage system, and organizing the files within a hierarchy of the storage system, and the performance of various other embodiments described above. Additionally, the web server 656 may provide application programming interface (API) functionality to send data directly to native client device operating systems, such as IOS®, ANDROID™, WEBOS® or RIM. The web server 656 also provides API functionality for exchanging data with the user device 604.

Example Embodiments

One example embodiment of the present disclosure includes a computer-implemented method for organizing a plurality of files stored in an electronic file system, the method including generating a plurality of similarity scores for corresponding pairs of files of the plurality of files stored in a first directory of the electronic file system, identifying at least two similar files based on the generated similarity scores, creating a second directory, and dynamically organizing the plurality of files by storing the at least two similar files in the second directory so that the number of files stored in the first directory is reduced, and files of the plurality of files are grouped together in one of the first directory or the second directory based on similarities in content indicated by the generated similarity scores. In one embodiment, the computer-implemented method further includes creating the second directory responsive to determining that the plurality of files stored in the first directory exceeds a threshold of a number of files permitted to be stored in the first directory. In one embodiment, the computer-implemented method further includes generating vector representation for at least some of the files of the plurality of files, wherein the generated vector representations are used to generate the plurality of similarity scores. In one embodiment, the method further includes generating a first vector representation of the first directory based on all of the files in the first directory, collectively. In one embodiment, the method further includes labeling the first directory by generating title vector representations of titles of content items in a database, generating similarity scores of the first vector representation of the first directory relative to the title vector representations, identifying, based on the similarity score, a first title similar to the first vector representation of the first directory, and labeling the first directory with the first title. In one embodiment, the identifying is further based on a click-through rate of the first title. In one embodiment, the similarity score is determined using a cosine similarity function. In one embodiment, the method further includes receiving a selection of at least one directory or at least one file of the plurality of files, generating, for the selected at least one directory or the at least one file, a selection vector representation, and searching for a file in the electronic storage system having a vector representation similar to that of the selection vector representation.

Another example embodiment includes a computer program product wherein the computer program product is stored on at least one non-transitory computer-readable medium that includes instructions that when executed by one or more processors cause a process to be carried out, the process including storing a plurality of files at an electronic storage system at a first directory, and generating a vector representation of at least some of the file of the plurality of files. Responsive to determining that the plurality of files stored in the first directory exceeds a threshold number of files permitted to be stored in the first directory, the method then includes generating a plurality of similarity scores using the generated vector representations, wherein each generated similarity score represents a similarity between pairs of files of the plurality of files, identifying at least two similar files based on the generated similarity scores, creating a second directory, and dynamically organizing the plurality of files by storing the at least two similar files in the second directory so that the number of files in the first directory is reduced to below the threshold, and files of the plurality of files are grouped together in one of the first directory or the second directory based on similarities in content indicated by the generated similarity scores. In one embodiment, the method performed upon execution of the computer program product includes generating a first vector representation of the first directory based on all of the files in the first directory, collectively. In one embodiment, the method performed upon execution of the computer program product includes labeling the first directory by generating title vector representations corresponding to titles of content items in a database, generating similarity scores of the first vector representation of the first directory relative to the title vector representations of the titles of content items in the database, identifying, based on the similarity score, a first title similar to the first vector representation, and labeling the first directory with the first title. In one embodiment, the identifying is further based on a click-through rate of the first title. In one embodiment, the similarity score is determined using a cosine similarity function. In one embodiment, the method performed upon execution of the computer program product includes receiving a selection of at least one directory or at least one file of the plurality of files, generating, for the selected at least one directory or the at least one file, a selection vector representation, and searching for a file in the electronic storage system having a vector representation similar to that of the selection vector representation.

Another example embodiment is a system for organizing electronically stored files that includes a file store configured for storing a plurality of files at an electronic storage system at a first directory, and a vector generator configured for generating vector representations of at least some of the file of the plurality of files. The system includes a similarity score module that, in response to determining that the plurality of files stored in the first directory exceeds a threshold number of files permitted to be stored in the first directory, is configured for generating a plurality of similarity scores using the generated vector representations, wherein each generated similarity score represents a similarity between pairs of files of the plurality of files and identifying at least two similar files based on the generated similarity scores. The system also includes an organizer module configured for creating a second directory and dynamically organizing the plurality of files by storing the at least two similar files in the second directory so that the number of files in the first directory is reduced to below the threshold, and files of the plurality of files are grouped together in one of the first directory or the second directory based on similarities in content indicated by the generated similarity scores. In an embodiment, the vector generator is further configured for generating a first vector representation of the first directory based on all of the files in the first directory, collectively. In an embodiment, the system further includes a directory labeling module configured for labeling the first directory by generating title vector representations of titles of content items in a database, generating similarity scores of the first vector representation of the first directory relative to the title vector representations, identifying, based on the similarity score, a first title similar to the first vector representation of the first directory and labeling the first directory with the first title. In one embodiment, the directory labeling module is further configured to identify a label of the first directory based on a click-through rate of the first title. In one embodiment, the similarity score is determined using a cosine similarity function. In one embodiment, the system includes a search engine that, in response to receiving a selection of at least one directory or at least one file of the plurality of files, and receiving from the vector generator a vector representation of the selection of the at least one directory or the at least one file, is configured for searching for a file stored in the electronic storage system having a similar vector representation using the generated vector representation of the selection of the at least one directory or the at least one file.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

What is claimed is:

1. A computer-implemented method for electronic file organization, the method comprising:
   generating a plurality of similarity scores for corresponding pairs of files of a plurality of files stored in a first directory of an electronic file system;
   identifying at least two similar files based on the generated similarity scores;
   creating a second directory;
   dynamically organizing the plurality of files by moving the at least two similar files from the first directory to the second directory so that each of the plurality of files is stored in either the first directory or the second directory, but not in both the first directory and the second directory, based on similarities in content indicated by the generated similarity scores;
generating a plurality of title-vector representations, each of which corresponds to a title of one of a plurality of content items stored in an external database;
generating a vector representation of the second directory based on at least a portion of the files moved to the second directory;
generating a plurality of title similarity scores for the vector representation of the second directory, each of which quantifies a similarity between (a) the vector representation of the second directory, and (b) one of the title-vector representations;
identifying, based on the title similarity scores, an identified title for the second directory that is (a) similar to the vector representation of the second directory, and (b) associated with one of the plurality of content items stored in the external database; and
labeling the second directory with the identified title for the second directory.

2. The computer-implemented method of claim 1, further comprising creating the second directory responsive to determining that the plurality of files stored in the first directory exceeds a threshold number of files permitted to be stored in the first directory.

3. The computer-implemented method of claim 1, further comprising generating vector representations for at least some of the files stored in the first directory, wherein the generated vector representations are used to generate the plurality of similarity scores.

4. The computer-implemented method of claim 1, wherein the plurality of content items stored in the external database is different from the files stored in the second directory.

5. The computer-implemented method of claim 1, further comprising:
generating a vector representation of the first directory based on at least a portion of the files remaining in the first directory after the at least two similar files are moved to the second directory;
generating a plurality of title similarity scores for the vector representation of the first directory, each of which quantifies a similarity between (a) the vector representation of the first directory, and (b) one of the title-vector representations;
identifying, based on the title similarity scores for the vector representation of the first directory, an identified title for the first directory that is (a) similar to the vector representation of the first directory, and (b) associated with one of the plurality of content items stored in the external database; and
labeling the first directory with the identified title for the first directory.

6. The computer-implemented method of claim 1, wherein the external database includes more content items than a quantity of files stored in the second directory.

7. The computer-implemented method of claim 1, wherein the similarity scores for the corresponding pairs of files are determined using a cosine similarity function.

8. The computer-implemented method of claim 1, further comprising:
receiving a selection of a particular one of the plurality of files;
generating, for the selected file, a selection vector representation; and
searching for a target file in the electronic file system having a vector representation similar to that of the selection vector representation.

9. A computer program product wherein the computer program product is stored on at least one non-transitory computer-readable medium that includes instructions that when executed by one or more processors cause a process to be carried out, the process comprising:
storing a number of files at an electronic storage system at a first directory;
generating a vector representation of at least some of the files;
responsive to determining that the number of files stored in the first directory exceeds a threshold number of files permitted to be stored in the first directory:
generating a plurality of similarity scores using the generated vector representations, wherein each generated similarity score represents a similarity between pairs of the files;
identifying at least two similar files based on the generated similarity scores;
creating a second directory; and
dynamically organizing the files by moving the at least two similar files from the first directory to the second directory so that the number of files in the first directory is reduced to below the threshold number, and so that the files are grouped together in one of the first directory or the second directory based on similarities in content indicated by the generated similarity scores;
after moving the at least two similar files, generating a first vector representation of the first directory based on at least a portion of the files in the first directory;
generating title-vector representations of titles of content items in an external database;
generating title similarity scores for the title-vector representations relative to the first vector representation of the first directory;
identifying, based on the title similarity scores, a plurality of titles having similarity scores above a threshold similarity;
identifying a selected title from amongst the plurality of titles having similarity scores above the threshold similarity based on a click-through rate associated with the selected title, wherein the click-through rate measures how frequently a content item associated with the selected title has been accessed, and wherein the click-through rate is higher than a click-through rate associated with any of the other titles amongst the plurality of titles; and
labeling the first directory with the identified selected title.

10. The computer program product of claim 9, wherein the first vector representation of the first directory is generated based on all files in the first directory, collectively.

11. The computer program product of claim 10, wherein the external database includes a collection of content items that is different from the files stored in the first directory.

12. The computer program product of claim 9, the process further comprising:
after moving the at least two similar files, generating a second vector representation of the second directory based on at least a portion of the files in the second directory; and
storing the first vector representation of the first directory and the second vector representation of the second directory in a memory.

13. The computer program product of claim 9, wherein the similarity scores for the pairs of files are determined using a cosine similarity function.

14. The computer program product of claim 9, the process further comprising:
receiving a selection of a particular directory or file;
generating, for the particular directory or file, a selection vector representation; and
searching for a file in the electronic storage system having a vector representation similar to that of the selection vector representation.

15. A system for organizing electronically stored files, the system comprising:
a memory configured for storing (a) a number of files at an electronic storage system in a first directory, and (b) vector representations of at least some of the files;
a similarity score module that, in response to determining that the number of files stored in the first directory exceeds a threshold number of files permitted to be stored in the first directory, is configured for:
generating a plurality of similarity scores using the vector representations, wherein each generated similarity score represents a similarity between pairs of the files; and
identifying at least two similar files based on the generated similarity scores;
an organizer module configured for:
creating a second directory; and
dynamically organizing the files by moving the at least two similar files from the first directory to the second directory so that the number of files in the first directory is reduced to below the threshold number, and so that the at least two similar files are no longer stored in the first directory, wherein the memory is further configured to store a vector representation of the second directory; and
a directory labeling module configured to label the second directory by:
generating a plurality of title-vector representations, each of which corresponds to a title of a content item stored in a database;
generating a plurality of title similarity scores for the vector representation of the second directory, each of which quantifies a similarity between (a) the vector representation of the second directory, and (b) one of the title-vector representations;
identifying, based on the title similarity scores, a plurality of titles having similarity scores above a threshold similarity;
identifying a selected title from amongst the plurality of titles based on a click-through rate associated with the selected title, wherein the click through rate measures how frequently a content item associated with the selected title has been accessed; and
labeling the second directory with the identified selected title.

16. The system of claim 15, wherein the memory is further configured for storing a vector representation of the first directory based on all files in the first directory after the at least two similar files are moved from the first directory to the second directory.

17. The system of claim 16, wherein the directory labeling module is further configured for labeling the first directory by:
generating a plurality of title similarity scores for the vector representation of the first directory, each of which quantifies a similarity between (a) the vector representation of the first directory, and (b) one of the title-vector representations;
identifying, based on the title similarity scores for the vector representation of the first directory, a first title that is (a) similar to the vector representation of the first directory, and (b) associated with one of the content items in the database; and
labeling the first directory with the first title.

18. The system of claim 15:
wherein the memory is further configured to store a vector representation of the first directory based on at least a portion of the files remaining in the first directory after the at least two similar files are moved from the first directory to the second directory.

19. The system of claim 15, wherein the similarity scores are determined using a cosine similarity function.

20. The system of claim 15, further comprising a search engine that, in response to receiving a selection of a particular one of the files stored at the electronic storage system directory or file, and receiving from the memory a selection vector representation for the selected file, is configured for searching for a target file stored in the memory having a vector representation similar to that of the selection vector representation.

* * * * *